ature of
United States Patent [19]
Wyman et al.

[11] 4,081,429
[45] Mar. 28, 1978

[54] HEAT-STABILIZED POLYURETHANE ELASTOMER

[75] Inventors: Ransome J. Wyman, Redondo Beach; Laxmi C. Gupta, South Gate, both of Calif.

[73] Assignee: ARNCO, Marina del Rey, Calif.

[21] Appl. No.: 657,717

[22] Filed: Feb. 13, 1976

[51] Int. Cl.$^2$ .............................................. C08G 18/24
[52] U.S. Cl. ..................... 260/77.5 AB; 260/45.7 SE; 260/75 NB; 260/77.5 SS
[58] Field of Search ................. 260/77.5 SS, 77.5 AB, 260/45.7 SE, 75 NB

[56] References Cited

U.S. PATENT DOCUMENTS

| | | | |
|---|---|---|---|
| 3,222,301 | 12/1965 | Dahm | 260/45.7 SE |
| 3,228,909 | 1/1966 | Oddo | 260/45.7 SE |
| 3,542,701 | 11/1970 | van Raamsdonk | 260/2.5 AJ |

FOREIGN PATENT DOCUMENTS

| | | | |
|---|---|---|---|
| 1,449,352 | 10/1967 | France | 260/2.5 AJ |

*Primary Examiner*—Eugene C. Rzucidlo
*Attorney, Agent, or Firm*—Herbert E. Kidder

[57] ABSTRACT

Heat stabilization of polyurethane elastomer catalyzed with organo-metallic catalyst is accomplished by adding a minor amount of elemental sulfur or sulfur-donor material to the liquid mixture of polyol and organic polyisocyanate at the time the catalyst is added. The sulfur remains inert during the polymerization reaction, and as long as the temperature of the cured elastomer does not exceed about 200° F. When the temperature of the urethane exceeds 200° F, the sulfur reacts with the catalyst to form a metallic sulfide, which results in the complete neutralization, or deactivation of the catalyst. Elimination of the organo-metallic catalyst prevents depolymerization of the urethane, and the urethane therefore remains solid at high temperatures for much longer periods of time than has heretofore been possible. The amount of sulfur required to deactivate will depend upon the metal content of the organo-metallic catalyst.

2 Claims, No Drawings

HEAT-STABILIZED POLYURETHANE ELASTOMER

BACKGROUND OF THE INVENTION

The present invention pertains to stabilizing at high temperatures urethane elastomers prepared with organo-metallic catalysts.

Polyurethane elastomers have acquired an important place in the present-day technology of synthetic resins, and one notable use of this elastomer is as a tire-filling material to convert a pneumatic tire into a solid, flat-free tire, primarily for use on industrial or off-road vehicles. The tire-filling urethane elastomer is a soft, resilient, rubbery polymer formed by mixing two reactive liquids with a suitable catalyst, the said mixture then being pumped into the tire through the inflation valve, where it cures to form a solid tire. The catalyst serves to speed up the polymerization reaction, and two types of catalyst are generally used at the present time; one being the amine type, and the other an organo-metallic type. The organo-metallic catalysts are favored over the amine type because they produce a more rapid polymerization reaction and require a minimum of heat to cure the urethane. However, the organo-metallic catalysts frequently have a detrimental effect on the heat stability of the urethane elastomer, and the most effective organo-metallic catalysts usually have the worst effect. For that reason, they are rarely used when high heat-resistance properties are required. The detrimental effect of the organo-metallic catalyst is that it causes the product to revert, or depolymerize at temperatures above 200° F. With depolymerization, the solid urethane elastomer becomes liquid again, and the reaction does not reverse itself when the material cools. As a result, polyurethane elastomer as a tire-filling material has certain limitations, which sometimes restrict its use.

We have discovered that when urethane elastomer catalyzed with organo-metallic catalyst is allowed to cure in contact with rubber, the material immediately adjacent the rubber was considerably harder than the same material at a location more remote from the rubber surface after being subjected to temperatures in excess of 200° F. At the same time, the material adjacent the rubber was discolored by being blackened. The higher hardness of the material immediately adjacent the rubber was a very desirable property, as it indicated a greater resistance to high temperatures.

At first, the discoloration was thought to be due to carbonization of the urethane at the high temperature to which it was exposed, but subsequent investigation led to the conclusion that the blackening effect was caused by reaction of something in the elastomer with something that had migrated from the rubber. Checking all of the known ingredients in ordinary tire rubber, it finally became evident that the ingredient that was causing this heat stabilization effect was sulfur, and what was happening was that the sulfur was migrating from the tire rubber into the elastomer, where it reacted with the catalyst, forming a metallic sulfide with its characteristic black color. With the metallic ions thus removed from the organo-metallic catalyst, the catalyst is completely neutralized, or deactivated, and depolymerization of the urethane at temperatures above 200° F is slowed as the catalyst promotes the depolymerization reaction. A very important factor in this reaction is that the initial polymerization reactions occur at a temperature well below 200° F, at which temperature the sulfur remains inert and does not react with the metallic ions in the catalyst. Thus, the catalyst is able to do its job of accelerating the polymerization of the urethane without interference by the sulfur, and the sulfur then remains inert in the urethane until such time as the temperature rises into the range of 200°–250° F. At this elevated temperature, the sulfur quickly reacts with the catalyst, forming a metallic sulfide, and completely neutralizing the catalyst so that it cannot depolymerize the urethane. The sulfur does not appear to react in any way with the urethane itself, but only with the catalyst, which represents an extremely small percentage of the total.

SUMMARY OF THE INVENTION

The primary object of the present invention is to provide a method of stabilizing polyurethane elastomers prepared with the use of organo-metallic catalysts so that they will withstand temperatures well above 200° F for extended periods of time without appreciable degradation of the urethane and without loss of hardness.

Another object of the invention is to provide a heat-stabilized polyurethane elastomer capable of withstanding high temperatures, and therefor particularly suitable for use as a tire fill material.

These objects are achieved by dissolving a minor proportion of finely divided elemental sulfur or a sulfur-donor compound in one of the reactive liquids, while the organo-metallic catalyst is added to the other liquid. When the two liquids are thoroughly mixed at the time of injection into the tire, the sulfur becomes uniformly dispersed throughout the elastomer, where it can react with all of the metallic ions in the catalyst whenever the temperature rises above 200° F.

DETAILED DESCRIPTION AND EXAMPLES

The urethane elastomer used as a tire fill is a soft, resilient, rubbery material formed as the product as the reaction of a polyisocyanate prepolymer and a polyester or polyether polyol. The processing technique for producing polyisocyanate prepolymer and the polyester or polyether polyols are well known in the art, and need not be described here. Moreover, the reaction of prepolymer with polyester or polyether polyols to form an elastomer, using organo-metallic catalysts to speed up the reaction, is also well known to those skilled in the art.

The preferred polyisocyanates are the aromatic diisocyanates such as 2,4-tolylene diisocyanate; 2,6-tolylene diisocyanate; and mixtures thereof. Other aromatic diisocyanates that can be used are: hexamethylene diisocyanate; tolidene diisocyanate; 4,4'-diphenylmethane diisocyanate; m-phenylene diisocyanate; p-phenylene diisocyanate; m-xylylene diisocyanate; 3,3'-dimethyl 4,4'-diphenyl diisocyanate; 1,5-naphthalene diisocyanate; 3,3' dimethyl-4,4'-diphenylmethane diisocyanate; 4,4'-diisocyanate diphenylether; and other di- and higher polyisocyanates. Mixtures of two or more of these isocyanates can be used if desired.

The high molecular weight polyols suitable for use in the preparation of the urethane elastomer can be polyesters, polyethers, or other hydroxyterminated hydrocarbon resins. Examples of such polyols which can, of course, be employed singly or in combination are: polyethers such as polyoxyalkalene glycols, for example polyoxyethylene glycols prepared from ethylene oxide; polyoxypropylene glycols prepared from 1,2-propylene oxide; mixed oxyethyleneoxypropylene polyglycols prepared in a similar manner using a mixture of ethylene oxide and 1,2-propylene oxide; or higher polyethers obtained by reaction with triol or higher polyol, such as glycerine, trimethylopropane and pentaerythritol. Another is polytetramethylene ether glycols prepared from tetrahydrofuran.

Polyester reactants that may be used in the preparation of the urethane elastomer are hydroxyl group terminated polyfunctional materials prepared from dibasic carboxylic acids or its anhydrides, and polyhydric alcohols; or obtained by condensation of a lactone such as caprolactone with a glycol, such as ethylene glycol, propylene glycol, and the like; a diamine, such as ethylene diamine, 1,2-propylene diamine, and the like; or an aminoalcohol, such as ethanolamine, propanolamine, isopropanolamine, and the like, in accordance with procedures well known in the art and described in U.S. Pat. No. 2,914,556.

In making a heat-stabilized urethane according to the invention, the polymerization reaction is catalyzed with an organo-metallic catalyst. Examples of such organometallic catalysts are: lead octoate, stannous octoate, stannous acylate, dialkyltin diacylate, dibutyltin dilaurate, and phenyl mercuric propionate. Other organometallic catalysts may also be used.

The catalyst may be used in varying proportions from about 0.01% to about 1% by weight of the polyisocyanate and polyether or polyester polyol mixture. Also added to the liquid reactants prior to filling the tire is a minor quantity of finely divided elemental sulfur. The quantity of sulfur that is added is essentially the amount required to react with all of the metallic ions. Thus, the quantity of sulfur will generally be approximately the same by weight as the amount of catalyst.

The principle of the invention is simple. The organometallic catalyst is required to speed the cure of the urethane elastomer, but once it has done its job it is no longer needed, and in fact, is a serious detriment as it tends to promote depolymerization of the urethane should the temperature of the urethane rise appreciably above 200° F. To prevent this undesirable tendency of the urethane to depolymerize at high temperatures, it is necessary to eliminate, or deactivate the catalyst. This is done by incorporating sulfur into the urethane which, at temperatures above 200° F, reacts with the metal ions in the catalyst to form metal sulfides. The catalyst thus becomes totally ineffective, and is therefore unable to promote depolymerization of the urethane. The urethane now has vastly improved heat aging properties, which extends both the load and speed limitations for tires filled with this material. Heat resistance is also improved for tire retreading.

The heat-stabilized urethane elastomer of the invention is preferably made by mixing approximately equal volumes of two liquid reactants, one of which comprises an isocyanate-terminated prepolymer, and the other a polyether or polyester polyol. Preferably, one of the liquids has the catalyst incorporated therein, and the other has the sulfur incorporated therein. The two liquid reactants are thoroughly mixed together just prior to being injected into a tire or otherwise molded, and after being pumped into the tire or mold, the mixture is allowed to cure for 24 hours at ambient temperature, or alternatively, for a shorter time at higher temperature (e.g., 10 hours at 100° C). During the polymerization reaction, the sulfur remains totally inert, and has no adverse effect on the catalyst. The catalyst is therefore able to perform its function of speeding up the polymerization reaction.

The following examples are shown for the purpose of illustrating the principles of the invention, and the manner in which the invention is carried out. It will be understood by those skilled in the art that the invention is not limited to the exact ingredients or proportions of ingredients used in the examples, as various changes and modifications can be made without departing from the broad scope of the invention as defined more precisely in the claims.

The Prepolymer Reactant

Two different batches of prepolymer reactant were prepared as follows:

Prepolymer A — To 1000 parts by weight of polypropyleneglycol (PPG) diol of 2000 Molecular weight (MW) at 25° C was added 190 parts by weight of toluene diisocyanate (TDI). This mixture was heated for 4 hours at 80° C to give a prepolymer with approximately 4.2% free NCO and an equivalent weight of 1000.

Prepolymer B — To 1000 parts by weight of PPG diol of 2000 MW, and 2 parts by weight of finely divided elemental sulfur at 25° C was added 200 parts of TDI. This mixture was heated for 4 hours at 80° C to give a prepolymer with the same free NCO and the same equivalent weight as in prepolymer A.

The Polyol Reactant

Polyol P1 — A PPG triol capped with ethylene oxide to give a 3000 MW triol with 50% primary hydroxy groups.

Polyol P2 — A blend of 1000 parts of Polyol P1 and 0.3 parts by weight of dibutyltin dilaurate.

Polyol P3 — A blend of 1000 parts of Polyol P1 and 0.3 parts of stannous octoate.

Polyol P4 — A blend of 1000 parts of Polyol P1 and 0.3 parts of dibutyltin dicarboxylate.

Polyol P5 — A blend of 1000 parts of Polyol P1 and 1 part of phenylmercuric propionate.

Polyol P6 — A blend of 1000 parts of Polyol P1 and 0.3 parts of lead octoate.

In the following examples, several castings were made of each material so as to provide samples from which test could be made of hardness (Shore A) of exposed surfaces and unexposed material, both before and after heating to 160° C for 8 hours. The results are given in Table I, which follows the examples. All Proportions in the examples are by weight.

EXAMPLE I

A blend of 100 parts of Prepolymer A and 98 parts of Polyol P1 in a half-pint can was cured for 10 hours at 100° C and then allowed to equilibrate at 25° C for at least 2 days. The hardness of the unexposed surfaces at that time was 39 Durometer A. The exposed, or top surface, had a hardness of 37 Durometer A. The can was sealed, then heated for 8 hours at 150° C. After cooling for 16 hours at 25° C, the hardness was 39 Durometer A at the unexposed surfaces and 28 Durometer A on the exposed top surface of the sample.

EXAMPLE II

A blend of 100 parts of Prepolymer B and 98 parts of Polyol P1 was cured for 10 hours at 100° C and then allowed to equilibrate at 25° C for at least 2 days. The sample was tested for hardness, and then heated to 150° C for 8 hours, after which it was cooled to ambient temperature and tested again for hardness. The results are given in Table I.

EXAMPLE III

A blend of 100 parts of Prepolymer A and 98 parts of Polyol P2 was cured for only 2 hours at 100° C, then cooled, tested for hardness, heated to 150° C for 8 hours, cooled to ambient temperature, and tested again for hardness. See Table I for the results.

EXAMPLE IV

A blend of 100 parts of Prepolymer B and 98 parts of Polyol P2 was cured for only 2 hours at 100° C, then cooled, tested for hardness, heated to 150° C for 8 hours, and tested again for hardness. See Table I.

EXAMPLE V

A blend of 100 parts of Prepolymer A and 98 parts of Polyol P3 was cured for 6 hours at 100° C, then cooled, tested for hardness, heated to 150° C for 8 hours, and tested again for hardness. See Table I.

EXAMPLE VI

A blend of 100 parts of Prepolymer B and 98 parts of Polyol P3 was cured for 6 hours at 100° C, then cooled, tested for hardness, heated to 150° C for 8 hours, and tested again for hardness. See Table I.

EXAMPLE VII

A blend of 100 parts of Prepolymer A and 98 parts of Polyol P4 was cured for 2 hours at 100° C, then cooled, tested for hardness, heated to 150° C for 8 hours, and tested again for hardness. See Table I.

EXAMPLE VIII

A blend of 100 parts of Prepolymer B and 98 parts of Polyol P4 was cured for 2 hours at 100° C, then cooled, tested for hardness, heated to 150° C for 8 hours, and tested again for hardness. See Table I.

EXAMPLE IX

A blend of 100 parts of Prepolymer A and 98 parts of Polyol P5 was cured for 2 hours at 100° C, then cooled, tested for hardness, heated to 150° C for 8 hours, and tested again for hardness. See Table I.

EXAMPLE X

A blend of 100 parts of Prepolymer B and 98 Parts of Polyol P5 was cured for 2 hours at 100° C, then cooled, tested for hardness, heated to 150° C for 8 hours, and tested again for hardness. See Table I.

EXAMPLE XI

A blend of 100 parts of Prepolymer A and 98 parts of Polyol P6 was cured for 2 hours at 100° C, then cooled, tested for hardness, heated to 150° C for 8 hours, and tested again for hardness. See Table I.

EXAMPLE XII

A blend of 100 parts of Prepolymer B and 98 parts of Polyol P6 was cured for 2 hours at 100° C, then cooled, tested for hardness, heated to 150° C for 8 hours, and tested again for hardness. See Table I.

TABLE I

| Ex. | Initial Hardness Durometer A | | Final Hardness Durometer A | | % changed Unexposed |
|---|---|---|---|---|---|
| | Unexposed | Exposed | Unexposed | Exposed | |
| I | 39 | 37 | 39 | 28 | 0 |
| II | 39 | 38 | 39 | 28 | 0 |
| III | 47 | 47 | 0 | 0 | 100% |
| IV | 47 | 47 | 33 | 19 | 30% |
| V | 45 | 43 | 36 | 33 | 20% |
| VI | 37 | 34 | 37 | 23 | 0 |
| VII | 47 | 43 | 10 | 10 | 79% |
| VIII | 47 | 42 | 37 | 30 | 21% |
| IX | 47 | 43 | 28 | 15 | 40% |
| X | 47 | 42 | 36 | 32 | 23% |
| XI | 47 | 44 | 27 | 27 | 42% |
| XII | 47 | 45 | 41 | 38 | 13% |

Using hardness as the criteria for measuring degradation of the polymer, a large drop in hardness after heat-aging would indicate depolymerization. Table I shows the hardness of the cured samples before heat-aging and then after heat-aging. Examples I and II, compared to the remainder of the examples, definitely show that degradation of the polymer is associated with organo-metallic catalysts. Also, comparing the even-numbered examples (II, IV, VI, VIII, X and XII) which contain sulfur, with the odd-numbered examples, which do not, it is clearly evident that the sulfur has an extremely beneficial effect, due to inhibiting or deactivating the organo-metallic catalyst.

The foregoing detailed description and illustrative examples are intended solely to illustrate the principles and method of the invention, and are not to be taken as restrictive in any way. Instead, the invention is limited solely by the claims that follow.

What we claim is:

1. The method of making heat-stabilized polyurethane elastomer catalyzed with an organo-metallic catalyst, which comprises the steps of:
    combining a mixture of isocyanate-terminated prepolymer and polyester or polyether polyol with an organo-metallic catalyst and sulfur in an amount at least equal to the mole-equivalent of metal ions in the catalyst;
    curing the mixture at a temperature below that at which the sulfur reacts with the metal ions of the catalyst;
    subjecting the cured mixture to conditions of elevated temperature at which the sulfur will react with the metal ions of the catalyst and thereby prevent depolymerization of the elastomer.

2. A heat stabilized polyurethane elastomer produced according to the process of claim 1.

* * * * *

REEXAMINATION CERTIFICATE (457th)
United States Patent [19]
Wyman et al.

[11] B1 4,081,429
[45] Certificate Issued  Feb. 11, 1986

[54] HEAT-STABILIZED POLYURETHANE ELASTOMER

[75] Inventors: Ransome J. Wyman, Redondo Beach; Laxmi C. Gupta, South Gate, both of Calif.

[73] Assignee: ARNCO, Marina del Rey, Calif.

Reexamination Request:
No. 90/000,652, Oct. 18, 1984

Reexamination Certificate for:
Patent No.: 4,081,429
Issued: Mar. 28, 1978
Appl. No.: 657,717
Filed: Feb. 13, 1976

[51] Int. Cl.$^4$ ............................................. C08G 18/24
[52] U.S. Cl. ............................................. 528/48; 524/742; 524/871; 528/55; 528/58; 528/76; 528/80
[58] Field of Search ............... 524/590, 591, 723, 871, 524/742; 528/48, 55, 58, 76; 152/357 R

[56] References Cited

U.S. PATENT DOCUMENTS

| | | | |
|---|---|---|---|
| 2,317,868 | 4/1943 | Turner | 260/83 |
| 2,356,955 | 8/1944 | Thomas | 260/79 |
| 2,477,225 | 7/1949 | Zoss | 260/61.1 |
| 2,582,510 | 1/1952 | Stiratelli | 260/45.7 |
| 2,599,544 | 6/1952 | Crouch | 260/45.7 |
| 2,978,434 | 4/1961 | Howald | 260/45.7 |
| 3,049,521 | 8/1962 | Burkholder | 260/87.1 |
| 3,111,499 | 4/1963 | Heuck | 260/41 |
| 3,124,545 | 3/1964 | Proops | 260/2.5 |
| 3,230,199 | 1/1966 | Muhlhausen | 260/75 |
| 3,322,717 | 5/1967 | Kendal | 260/45.7 |
| 3,428,598 | 2/1969 | Matsubayashi | 260/45.75 |
| 3,767,613 | 10/1973 | Dix | 260/41 B |

FOREIGN PATENT DOCUMENTS

50-13446  2/1975  Japan.
427967  5/1974  U.S.S.R.

OTHER PUBLICATIONS

Chemical Abstracts, vol. 83, 1975, 44230t.
Chemical Abstracts, vol. 82, 1975, 59082z.

*Primary Examiner*—Veronica P. Hoke

[57] ABSTRACT

Heat stabilization of polyurethane elastomer catalyzed with organo-metallic catalyst is accomplished by adding a minor amount of elemental sulfur or sulfur-donor material to the liquid mixture of polyol and organic polyisocyanate at the time the catalyst is added. The sulfur remains inert during the polymerization reaction, and as long as the temperature of the cured elastomer does not exceed about 200° F. When the temperature of the urethane exceeds 200° F., the sulfur reacts with the catalyst to form a metallic sulfide, which results in the complete neutralization, or deactivation of the catalyst. Elimination of the organo-metallic catalyst prevents depolymerization of the urethane, and the urethane therefore remains solid at high temperatures for much longer periods of time than has heretofore been possible. The amount of sulfur required to deactivate will depend upon the metal content of the organo-metallic catalyst.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1 and 2 are cancelled.

* * * * *